United States Patent
Fujisaki et al.

(10) Patent No.: US 6,466,574 B1
(45) Date of Patent: Oct. 15, 2002

(54) QUALITY OF SERVICE IMPROVEMENT OF INTERNET REAL-TIME MEDIA TRANSMISSION BY TRANSMITTING REDUNDANT VOICE/MEDIA FRAMES

(75) Inventors: Tetsunosuke Fujisaki, Armonk, NY (US); Yoav Medan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/092,824

(22) Filed: Jun. 5, 1998

(51) Int. Cl.[7] .................. H04L 12/26; H04L 12/28; H04J 1/16; H04J 3/14; G06F 15/16

(52) U.S. Cl. .............. 370/356; 370/218; 370/237; 370/394; 370/473; 714/776; 714/781

(58) Field of Search .................. 370/356, 394, 370/473, 380, 389, 396, 401, 218, 228, 248, 360, 355, 237, 354; 709/231; 714/776, 781

(56) References Cited

U.S. PATENT DOCUMENTS

| 5,175,765 | A |   | 12/1992 | Perlman |          |
|-----------|---|---|---------|---------|----------|
| 5,371,852 | A |   | 12/1994 | Attanasio et al. | |
| 5,671,215 | A | * | 9/1997  | Foglar ..................... | 370/227 |
| 5,883,891 | A | * | 3/1999  | Williams et al. ........... | 370/356 |
| 5,928,331 | A | * | 7/1999  | Bushmitch ................. | 709/231 |
| 6,058,116 | A | * | 5/2000  | Hiscock et al. ............ | 370/401 |
| 6,154,445 | A | * | 11/2000 | Farris et al. ............... | 370/237 |
| 6,170,075 | B1 | * | 1/2001 | Schuster et al. ........... | 714/776 |
| 6,195,349 | B1 | * | 2/2001 | Hiscock et al. ............ | 370/360 |
| 6,307,834 | B1 | * | 10/2001 | Worster .................... | 370/218 |

FOREIGN PATENT DOCUMENTS

| JP | 61-224640  | 10/1986 |
| JP | 03-42940   | 2/1991  |
| JP | 07-046250  | 2/1995  |
| JP | 07-336357  | 12/1995 |
| JP | 08-181697  | 7/1996  |
| JP | 08-256158  | 12/1996 |

OTHER PUBLICATIONS

C. Li and C. J. Georgiou, "Implementation and Performance Analysis of Congestion–Tolerant Isochronous Communication in ATM Networks Using Diversified Routing," *IEEE*, 1994, pp. 1341–1345.

B. Edmaier, et al., "Alignment Server for Hitless Path–Switching in ATM Networks," *Proceedings of the International Switching Symposium*, Apr. 1995, vol. 2, pp. 403–407.

(List continued on next page.)

*Primary Examiner*—Wellington Chin
*Assistant Examiner*—M. Phan
(74) *Attorney, Agent, or Firm*—Ryan, Mason & Lewis, LLP; Louis J. Percello, Esq.

(57) ABSTRACT

Improved reliability and reduced delays and packet losses of Internet media transmissions over packet switching networks such as Internet and Intranet is achieved by replicating a sent message/information packet(s) from one or more source computers connected to the network into two or more replicas of one or more of the packets of the sent message. Each of the replicas is then directed through a different route through the network to one or more destination computers. In one embodiment, each of the routes is determined so that the routes have the least number of routers and access points in common. Since the replicas are redundant, losses and delays of some of the replicas is not fatal to assemble the packet sequence at the destination(s). Thus, the destination computer can assemble the sent message/information packet from received replicas in a more complete and faster manner. Redundant replicas that are received can be ignored and/or discarded at the destination computer.

27 Claims, 14 Drawing Sheets

OTHER PUBLICATIONS

M. Soha, et al., "Comparison of Source Routings and Spanning Tree Bridges. Comparison of Two LAN Bridge Approaches," *IEEE Network: The Magazine of Computer Communications*, Jan. 1988, vol, 2, No. 1, pp. 37–43.

P. Ramanathan et al, Delivery of Time–Critical Messages Using a Multiple Copy.

Approach, ACM Transactions on Computer Systems, vol. 10, No. 2, May 1992, pp. 144–166.

Networking, The Internet Speaks, www.informationweek.com, Oct. 20, 1997.

M.E. Thyfault, Resurgence of Covergence, Voice–Data Integration, www.informationweek.com, Apr. 13, 1998.

Network Working Group, RTP: A Transport Protocol for Real–Time Applications, Lawrence Berkeley National Laboratory, Jan. 1996.

Latency Profile Graph, Motorola, Internet Software Products Division.

* cited by examiner case a: sc was 21 and s=27 arrived.

case b: sc was 25 and s=27 arrived.

QUALITY OF SERVICE IMPROVEMENT OF INTERNET REAL-TIME MEDIA TRANSMISSION BY TRANSMITTING REDUNDANT VOICE/MEDIA FRAMES

FIELD OF THE INVENTION

This invention relates to the field of real-time data/voice/media transmission over the internet, intranet, cable, and other any sort of packet switching networks. More specifically, the invention relates to a way to improve the quality of real-time packet transmission by using redundant transmission of packets.

BACKGROUND OF THE INVENTION

Internet Telephony and Internet Media transmission have huge business opportunities and many industry key players and major Telecom companies are rushing into this area. Many companies are marketing internet telephony gateway and internet telephony PC software. Companies are providing internet telephony services for low-cost long-distance calls and telecom companies are viewing Internet telephony as a way to unifi telephony and data infrastructure.

Internet Media transmission includes sending media packets (containing any of the following: n-dimensional images, animation, music, text, movies, video shots, still pictures, voice, data, etc.) over packet switching networks (e.g., a wide area network—WAN- and/or local area network—LAN) between two or more computers with special application software. Internet Telephony is a particular version of Internet Media where packets contain voice information (and sometimes video information). When the voice processed by an input device is captured at a source computer, an application running on the source computer will transform the continuous voice analog signals into a series of discrete digitally compressed packets. There are some well known industry standards to define this transformation process and the format of these discrete (often digitally compressed) packets, for example, PCM, GSM, G.723, etc.

There are other known processes defined by standards (e.g., IP, UDP, and RTP protocols) to augment the packets with necessary headers and trailers so that these packets can travel over the common packet switching network(s) to a destination computer. With these headers and trailers, packets usually travel over the packet switching network(s) independently. (See U.S. Pat. No. 5,371,852 to Attanasio et al. issued on Dec. 6, 1994 which is herein incorporated by reference in its entirety.) At the destination computer, arriving packets are stored in a buffer and are then transformed back into the form which is close to the original analog signal. The same industry standard (e.g., PCM, GSM, G.723, etc.) defines this transformation.

Some of the prior art has disclosed duplicating messages and transmitting them over "multiple disjointed routes" over a network topology to improve reliability and timely delivery of these messages. See "Delivery of Time-Critical Messages Using a Multiple Copy Approach" by P. Ramanathan and K. G. Shin, ACM fransactions on Computer Systems, Vol. 10, No. 2, May 1992, (here after the "Shin reference") which is herein incorporated by reference in its entirety.

STATEMENT OF PROBLEMS WITH THE PRIOR ART

Quality is a serious problem in sending media over packet switching networks, including Internet and Intranet. This problem comes from the two general characteristics of packet switching networks, namely: (A) packet switching networks cannot guarantee the delivery of packets, e.g., a packet can be lost on the way to the destination and (B) packet switching networks cannot guarantee the delivery of packets within given time, e.g., if the network is congested, packets are delayed inside the network.

These two characteristics come from the fact that packet switching networks comprise commonly used routers and links connecting them. Since these resources are shared by many packets, waiting queues for these resources are built into the network. When the network is congested, packets are forced to wait in these queues. When traffic volume exceeds the capacity of these queues, packets can be discarded. Due to these characteristics of packet switching networks, packet delays and losses are unavoidable for packet transmission over packet switching networks.

TCP (Transmission Control Protocol) remedies some of these shortcomings of packet switching networks by introducing a packet re-transmission mechanism outside of the network between source and destination computers. It arranges a buffer to store received packets internally. If some packets do not arrive in a given time, re-transmission of these packets is requested. Until all packets are received, with potentially multiple retries, the received data will not be released to the receiving application. Thus, TCP guarantees that all packets arrive but sacrifices transmission time, i.e., there are delays. Because of the delay caused by this automatic re-transmission, TCP protocol is not used for internet media transmission where delay is fatal.

For two-way Internet media transmission, long delays are fatal. While accepting some packets being lost, Internet media usually uses a protocol without built-in packet re-transmission (e.g., UDP or User Datagram Protocol). Even with this protocol, however, some packets may be lost in the network and there is no guarantee of a minimum time for transmission over the network (without delays). Usually, the upper layer application software controls the size of a waiting buffer and the maximum waiting time for packet arrivals.

One prior art system is described in "The 2nd Annual Internet Telephony, Summit" of Jul. 14–15, 1997, which is herein incorporated by reference. In particular, the "Motorola IP Telephony in Corporate Intranets" describes one instance of packet delay and losses in Internet media transmission. Here a series of packets were sent for a certain time from a source computer to a destination computer over the Internet. The article shows a graph of the arrival delay for each packet. In the graph, the X-axis corresponds to the packets from the first to the last. The Y-axis shows the time required for the packet to travel to the destination. The unit of the Y-axis is milliseconds. The graph shows that using the prior art Internet network to transmit Internet media is not as reliable as using the telephone network.

Some prior art literature compares the current state of the art of Internet/Intranet transmissions to transmissions over the telephone network as the follows. Compared to the telephone network that provides acceptable voice over 99.999% of use time, the Internet provides acceptable voice only in 94% of use time and the Internet provides acceptable voice only of 61% of use time. (See the article by Tom Nolle: President of CIMI Corp., entitled "Convergence 2000?" published in "Information Week", Apr. 15, 1998, page 141, which is herein incorporated by reference in its entirety.)

An example of a typical prior art networking system 100 for transmitting media information, including voice data, is shown as a block diagram in FIG. 1. The networking system 100 comprises a plurality of computers 160 that are connected to one or more networks 130 through well known network connectors such as modems and/or LAN adapters 150. The computers 160 typically can be any generally known computer system, such as a personal computer (like an IBM ThinkPad) or workstation (like an IBM AS400). For one way communications, one computer 160 would be the source computer 160S originating the transmission of information and one or more of the computers 160 would be the destination computer 160D that would receive the information. However, in many applications, both the source computer 160S and the destination computer 160D functions are contained in a single computer, e.g. 160, that can perform both these communication functions, i.e., sending and receiving, to enable point to point two way, one to many, and/or many to many communications. The computers 160 will have well known input and output devices like microphones 131, speakers 132, keyboards, mice, cameras, video recorders, screens, recorders, musical instruments, pen inputs, touch screens (not shown), etc. The combination of one or more multimedia interfaces 133, e.g. a sound card and/or video card 133, network interface software 134, and one or more network connections 150 converts signals from an analog continuous form 135 to a digital (and typically compressed) packetized form 120. Through the network connector 150, the packets are exchanged over the networks 130 between the computers 160.

The network(s) 130 can be any type of packet switching network which include but is (are) not limited to the Internet, intranets, extranets, wide area networks (VANs), local area networks (LANs), phone networks, and/or any combination or interconnection of such networks. Typically these networks comprise access points 140, routers 110, and network links (typically 175). Network links 175 connect these routers 110 and access points 140 to form the network as shown 130. These routers 110, access points 140, and network links 175 are typically operated by one or more internet service providers (ISP). Access points 140 are the gateways to outside world of the network 130. Various computers 160 can access to the network 140 via access points 140 by well known connections including: dial-up connections, dedicated line connections, cable connections, satellite connections, and other forms of well known connections. Access points 140 also could be a gateway to other networks operated by other ISPs.

Known standard protocols (IP protocol, PPP protocol, LAN protocol, etc.) support various computers 160 to exchange data and messages independently of the connection being used between the network connectors 150 and the access points 140. Particularly, User Diagram Protocol (UDP) and Real-Time Protocol (RTP) provide the ways for computers to exchange real-time Internet media packets over the network 130.

The series of connections (i.e. links 175) of access points and routers over which packets travel to destination is called a "path". Packet switching networks 130 and protocols like UDP and RTP are very well known. For more description of these networks and protocols see TCP/IP Illustrated, Volume 1 & 2, by W. Richart Stevens, Addison-Ersley Professional Computing Series, 1994 which is herein incorporated by reference in its entirety. In this disclosure, these packet switching networks 130 will be referred to as the network 130 without loss of generality.

The Shin reference discusses the use of redundancy to reduce packet delivery delay. In the reference, however, he uses hypothetical network such as C-Wrapped Hexagonal Mesh and Hypercube mesh where the same subpattern is repeated in the entire network. Using that assumption, it is possible to define disjoint routes mathematically between two end points. However, in the real network environments, the connections of routers are ad hoc. Networks are made up of legacy sub networks and many bypasses. In these situation, it is impossible to mathematically pre-compute disjoin routes. The Shin reference also assumes sending replicated packets over every one of the computed disjoint routes. This can create a severe demand on network resources.

OBJECTS OF THE INVENTION

An object of this invention is a system and method to provide more reliable end-to-end Internet media transmission between two or more points which are connected by one or more packet switching networks.

An object of this invention is a general way to improve the reliability of end-to-end Internet media transmission.

An object of this invention is a system and method for a source computer, a destination computer, and a reflection router to negotiate and determine one or more media transmission routes to improve transmission reliability.

An object of this invention is a system and method to introduce redundancy in media packet transmission to improve quality, reliability, and transmission delay.

An object of this invention is a system and method to replicate and unify packets at both ends of transmission routes to interface with software created for non-redundant media packet transmission.

An object of this invention is an improved system and method for a packet switching network communication that improves reliably and reduces delays in packet transmission.

SUMMARY OF THE INVENTION

This invention improves the reliability and reduces the delays and packet losses of Internet media transmissions over packet switching networks such as Internet and Intranet. The invention replicates a sent message/information packets from one or more source computers connected to the network into one or more replicas of one or more of the packets of the sent message. Each of the replicas is then directed through a different route through the network to one or more destination computers. In a preferred embodiment, the replication and routing is done randomly and each of the routes is determined so that the routes have the least number of routers and access points in common. Since the replicas are redundant, losses and delays of some of the replicas is not fatal to assemble the packet sequence at the destination(s). Thus, the destination computer can assemble the sent message/information packet from received replicas in a more complete and faster manner. Redundant replicas that are received can be ignored and/or discarded at the destination computer.

DETAILED DESCRIPTION OF THE INVENTION

Figure 1:
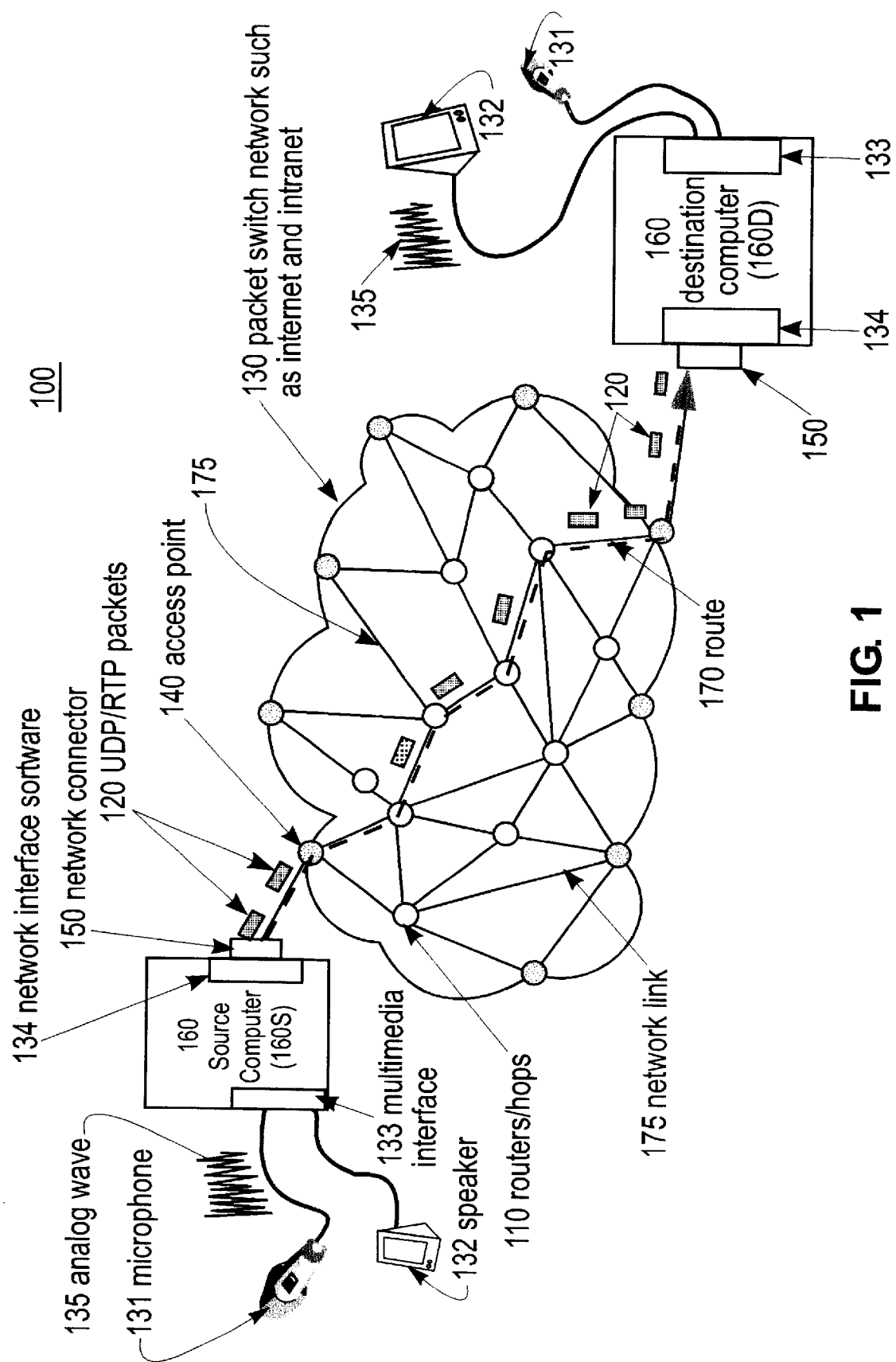
FIG. 1 is a block diagram of a known prior art packet networking system for transmitting media information, including voice data.
Figure 2A:
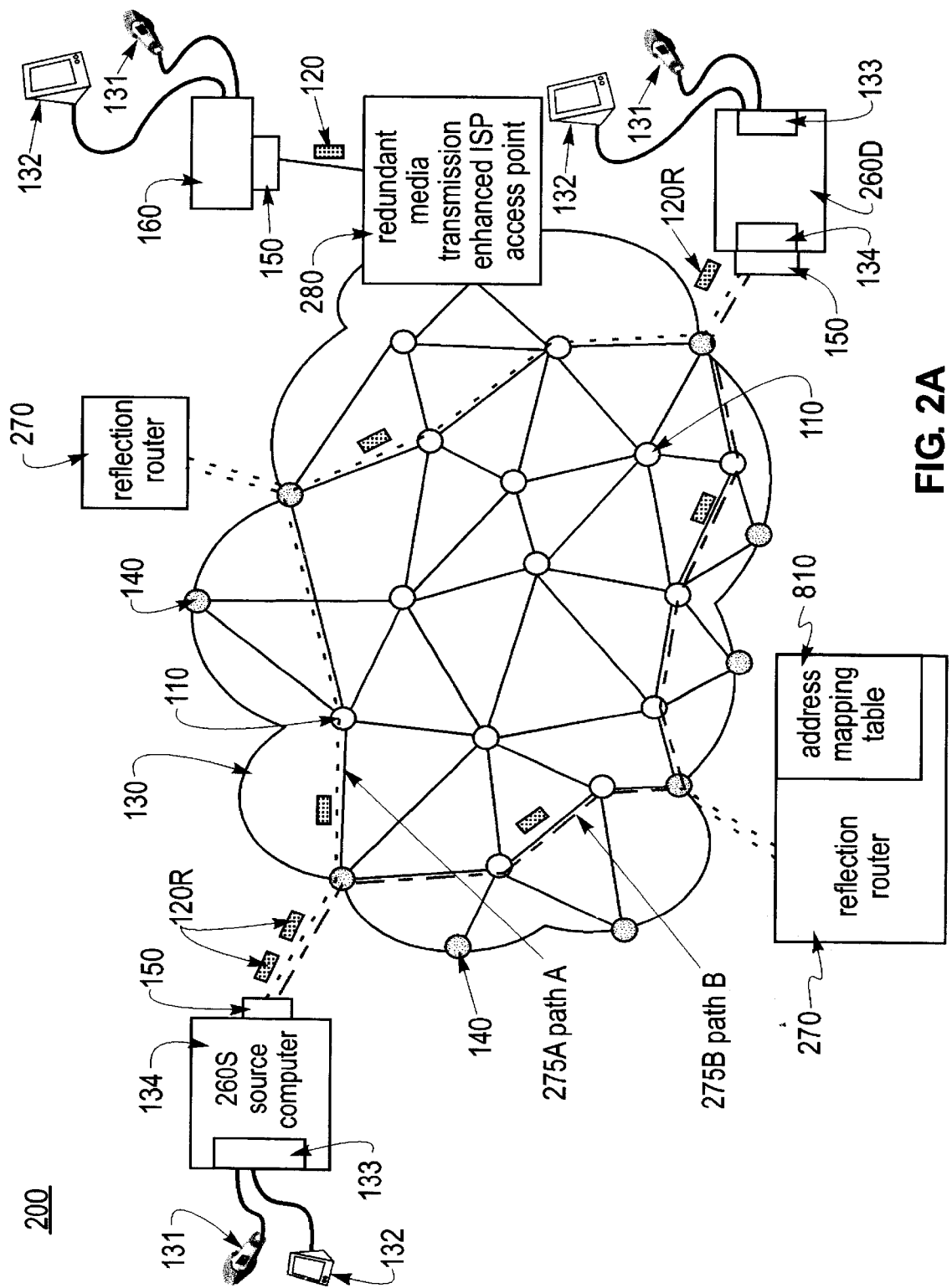
FIG. 2A is a block diagram of the invention included in a general packet switching network environment comprising an example ISP network.

FIG. 2A is a block diagram of the invention included in a general packet switching network environment. Elements of FIG. 2A that are common with those in FIG. 1 have the same numerical designators and descriptions.

The system 200 comprises one or more computers 260 and one or more reflection routers 270 connected to the network 130 via access points 140. The communication between two or more computers 260 takes place by sending one or more packets 120 of the message/information over two or more paths (e.g. 275A, 275B, typically 275) through the networks 130. This is done by replicating one or more of the packets 120 in various ways described below and sending those replicas 120R over different paths 275. In FIG. 2A, two paths are shown, path A (275A) and path B (275B). Packets 120 are created, sent, and received by well known techniques. Reflection routers 270 are computers which are used to have each path separated from each other as described later. Reflection routers 270 can become intermediate routers of some of the paths.

Computers 260 can be source computers 260S, that send one or more messages/information, or destination computers 260D that receive one or more of the messages/information. Of course in two way communication, the functions of the source 260S and destination 260D computers exist on two or more of the computers that are communicating. Therefore, elements of computer 260S and 260D can be packaged into a single computer 260 and these designations will be used interchangeably without loss of generality. One example of FIG. 2A would be an intranet.

In one alternative preferred embodiment shown in FIG. 2A, redundant media transmission enhanced access points 280 (FIGS. 9 and 10 below) enable prior art computers, not having the function of this invention, to connect to these enhanced access points 280 and to obtain the merit of redundant media transmission. In this configuration, replication and unification of packets will be performed inside the enhanced access points 280. In order to simplify the explanation, we will discuss first the detail of the invention using the combination of a source computer 260S (260), a destination computer 260D (260), and reflection routers 270. Subsequently, redundant media transmission with enhanced access points 280 will be explained.

Figure 2B:
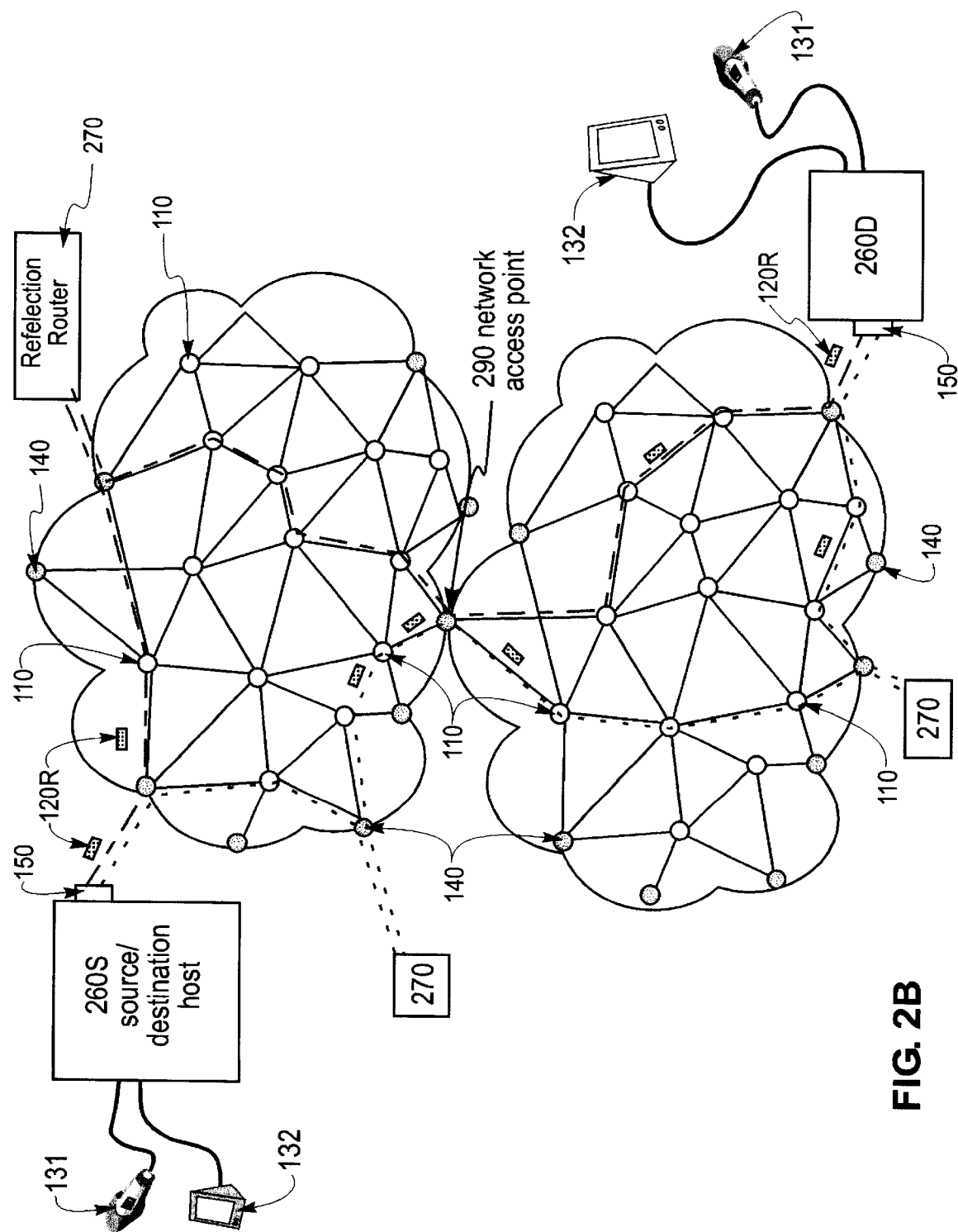
FIG. 2B is a block diagram of the invention included in a general packet switching network environment comprising multiple example ISP networks.

FIG. 2B is a block diagram of the case where the network comprises multiple ISP networks connected by network access points 290. As shown in the figure, source computers 260S, destination computers 260D, and reflection routers 270 can be configured in the similar way to the case of FIG. 2A. One example of FIG. 2B is the source computer accessing ISP X while the destination computer is accessing a different ISP Y.

Figure 3:
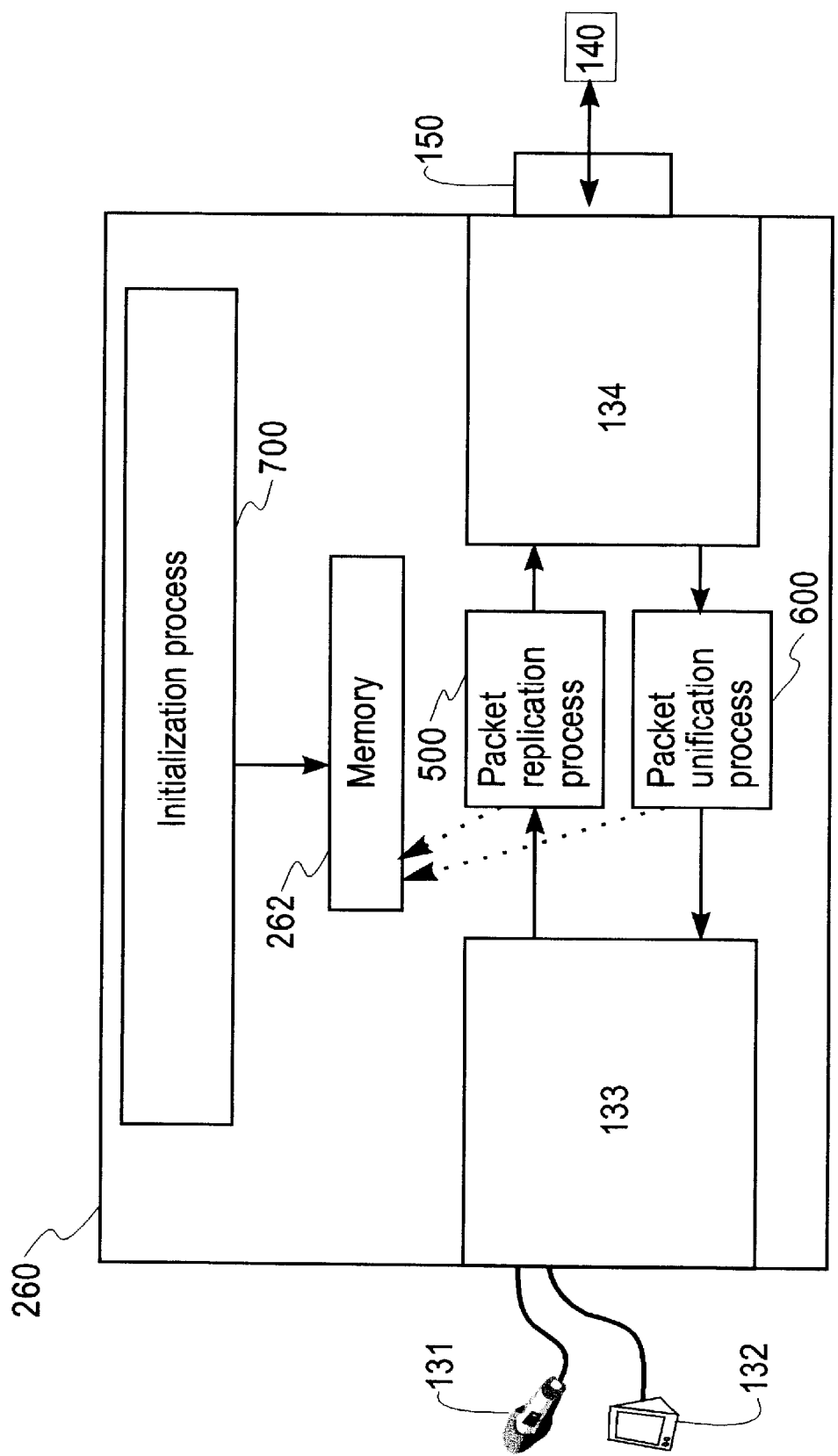
FIG. 3 is a block diagram of a typical source/destination host.

FIG. 3 is a block diagram of a typical source computer 260S or destination computer 260D (or computer 260) that is used in the invention. In a preferred embodiment, the computer 260 is used for two way communication. The computer comprises any standard well known media (e.g. voice or video) and/or multimedia interface 133, a standard well known network interface software 134, and a standard well known network connector 150 that in combination packetize the input to the media interface and transmit the packets in a protocol appropriate to the network 130 to which the computer 260 is connected 150. The computer further comprises one or more known memories 262, a novel initialization process 700, a novel replication process 500, and/or a novel unification process 600. The initialization process 700 selects the alternate paths for the replicas 120R to be sent, the replication process 500 performs the source computer 260S function of creating replicas 120R in various alternative ways, and unification process 600 performs the destination computer function of unifying received replicas 120R to re-form the original sent message at the destination. Memory 262 is used to keep the result of handshaking for the later reference from 500 and 600. These processes will be described in further detail below.

Figure 4:
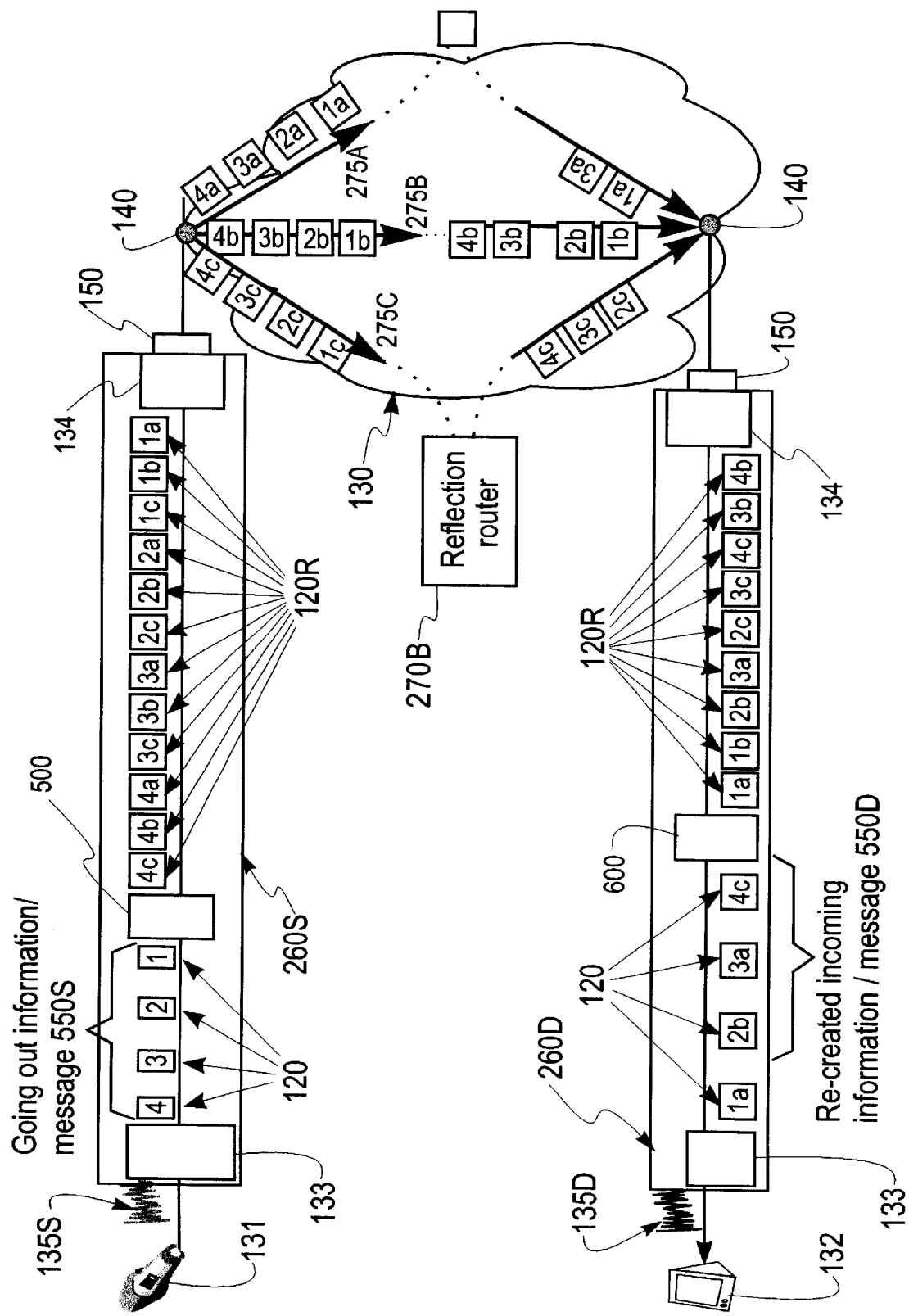
FIG. 4 is a diagram showing packet replication, packet unification, and packet reflection performed by the three elements of a preferred embodiment of this invention—a source computer, a destination computer, and a reflection router.

FIG. 4 is a block diagram that shows more detail relationships among the packet replication process 500, packet unification process 600, and packet reflection performed by the reflection router 270.

In one preferred embodiment, the replication process 500 of media packets occurs inside the source computer 260S, e.g., one replica 120R is created for each path (e.g. alternative 275A, 275B, and 275C). (An alternative preferred embodiment of the replication process 500 is explained below.) Replicated packets 120R are sent via a network connector 150 to the access point 140 where they enter into the packet switching network 130. Using novel techniques, e.g. in one preferred embodiment the reflection router 270, different paths (275A, 275B, 275C) are chosen when possible for each of the respective packet's replica(s) (120R). These replicas 120R therefore arrive at the same destination computer(s) 260D over different paths (e.g., 275A, 275B, and 275C) by traveling through different routers 110 and different network links 175.

In one preferred embodiment, the unification process 600 for replicas 120R occurs inside one or more of the destination computers 260D. The unification process assembles the sent message/information as the replicas 120R are received. In a preferred embodiment, the replicas 120R that are received first are used to make up the received message and the later received replicas 120R are discarded. While replicas 120R that fail to reach the destination by one or more of the paths 275 can not be used to re-create the sent message at the destination computer 260D, identical replicas 120R still have a chance of reaching the destination computer 260D by one or more of the other paths 275 and therefore can be used to re-create the sent message. In this way, speed and reliability of the message/information communication is improved.

Reflection routers 270 are used to reduce the number of routers and network links that each of the paths (275A, 275B, 275C) have in common. In a preferred embodiment of the handshaking process 700, reflection routers 270 are carefully chosen by the source computer 260S.

The effect of reflection routers can be explained by making an analogy to the post office infrastructure. Letters and parcels correspond to packets, mail boxes correspond to access points, intermediate post offices correspond to routers, and mail tracks are correspond to network links. Sometimes, mail will be delayed or lost. Using the invention to minimize the chance of losses or to reduce accidental delays, mail is replicated with the same destination tag and submitted in duplicate. If each duplicated piece of mail is carried by different tracks and handled by different post offices, the risk of not receiving (at least one of) a letter at the destination is reduced.

In this analogy, the role of reflection routers/servers 270 can be explained as follows. If duplicated letters are mailed from a mail box with same address tags, the risks of lost/delay are unlikely to be reduced because it is likely that these duplicated letters travel on the same tracks and via same post offices. To better reduce the risk of loss/delay, the sender negotiates with his friends to be the reflection routers. In this example, prior to the mailing of the three replicated letters, two friends A and B are chosen to be middlemen. With these agreements, address tags of A and B are put on two of the replicated letters, respectively. Having different address tags at different locations, the three replicas will travel to different destinations. Of course, friends A and B will replace their address tag with that of the final destination when they receive the replica. In addition, the replica should put into nearest mail box nearest the respective friend for forwarding to the final destination.

Therefore, in a preferred embodiment, reflection routers 270 are used to reduce risks of packet losses and accidental delay at intermediate routers by insuring that each replica 120R travels on a different path 175. In a more preferred embodiment (see below) the source 260S can be used to optimize the selection of paths (275 A and B). In FIG. 4, each of the packets (packet 1, 2, 3, and 4) is replicated three times into a set of replicas 120R (replica a, b, and c). All replicas 120R labeled "a" go to a first refection router and ultimately to the destination 260D via path 275A. All replicas 120R labeled "b" travel to the destination 260D over path 275B, and all replicas 120R labeled "c" travel to the destination 260D over path 275C.

After receiving the replicas 120R, the unification process 600 assembles the received replicas 120R to re-create the sent message. Reconstruction will be done by the use of the well known packet sequential number information in the RTP (Real-time Protocol) header which identifies the position of each of the replicas in the sent message.

In one preferred embodiment, the destination computer 260D uses the first replica 120R that is received for each given packet 120 in the set of packets that comprise the sent message. The destination computer 260D retains and uses this first received replica 120R to re-create the sent message and then discards all later received replicas 120R in the set that duplicate the used replica 120R. The retained replicas 120R are stored in the buffer array M 610 (below) to absorb possible packet disorder before releasing to the media (e.g. voice or video) and/or multimedia interface 133. That is some of retained replicas 120R could be received out of their order in the sent message. As the replicas 120R are received, those retained are placed in their correct order (of the sent message) as determined by their packet sequence number information in the header. Space is kept in the buffer array M 610 for the replicas in the sequence not yet received. Thus when, and if, these "late" replicas are received, they are placed in their saved place and in their proper order of the sent message. In one preferred embodiment, the buffer array M 610 has enough locations for a sequence of 10 received and retained replicas 120R.

Figure 5A:
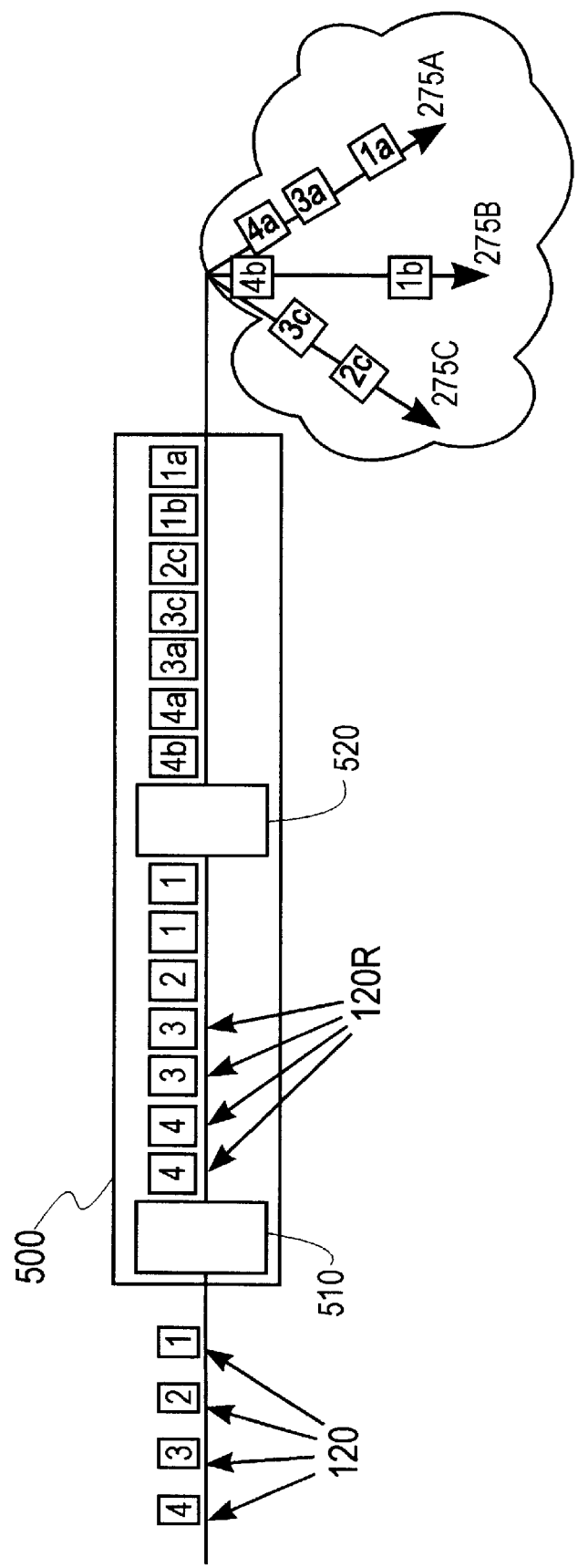
FIGS. 5A, 5B, and 5C are a block diagram showing an preferred embodiment of packet replication system, a flow chart of an interleaved replication process, and a flow chart of an interleaved route determination process, respectively.

FIG. 5A shows the details of an alternate preferred embodiment of the replication process 500. This embodiment enables the benefit of enhanced reliability of communication while controlling the increasing the total volume of packet transmission in the network 130. Without this embodiment, total volume of packet transmission in the network 130 will be doubled for 2-path redundancy and be tripled for 3-path redundancy, etc. For instance, this embodiment enables us to use 3-path redundancy only with only 30% (or any other selectable) increase of the total packet transmission volume over the network 130. In this embodiment certain of the packets 120 are replicated more than others in a random manner. A further enhancement randomly chooses the paths 275 over which the replicated packets 120R are transmitted.

One preferred embodiment of this process 500 is driven by two external numbers which will be given from the application as parameters. The first number, which is an integer N, specifies the number of paths 275 on which replicas 120R are to be transmitted over the network 130 for each given packet 120. (Selecting different paths for communicating the replicas 120R is describe further in FIG. 7 below.) FIG. 5A shows an example case where there are three selected different paths 275, the case of N=3. A second number, which is a rational number T between 0 and N (the number of paths 275A, B, C), specifies the target transmission volume increase. Thus T controls how much of the network 130 resources are used due to the replication.

With the idea of "redundant packet transmission", there is a tradeoff between the routing redundancy and the quality of media transmission - the more redundancy, the higher quality but the more network resources are used. Introduction of T allows to increase routing redundancy without increasing the total packet 120R transmission volume in the network 130 to the degree of the route redundancy. As stated above, the combination of N=3 and T=1.3 could provide good quality media transmission using three routes by increasing only 30% of the traffic volume over the network.

Figure 5B:
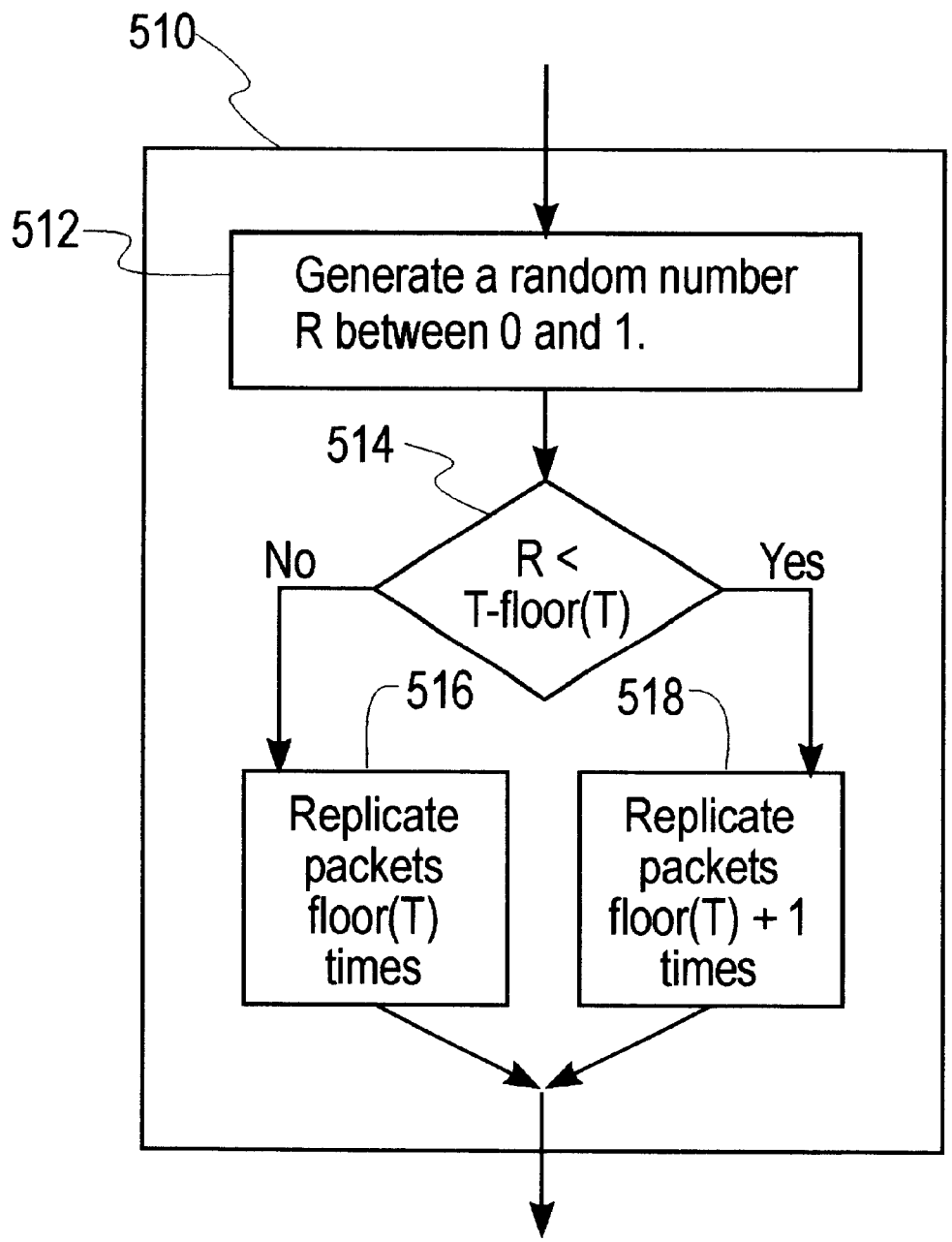

In FIG. 5B shows one preferred process 510 for implementing a strategy of producing a random number of replicas 120R. A rational number, T, such as 2.7, is chosen with decimal part (0.7) and an integer part (2). The number of replicas 120R created is controlled by the integer part, e.g., only an integral number of replicas such as 2 replicas or 3 replicas, can be created. In this process, the decimal part of T determines the percentage of packets to be replicated and the integer part of T determines the number of times replicas are made. Namely, if the target of average replication is set to 2.7, the preferred process 510 realizes the target 2.7. In this example, a packet has a probability of 0.7 to be replicated 3 times and a probability of 0.3 to be replicated 2 times. The random number "R" is used to realize this.

More specifically, in step 512, a random number, R, between 0 and 1 is generated. In step 514, the random number (R) is compared with the decimal portion of T. This decimal portion is obtained by taking the difference between T and the "floor" value of T. "Floor(T)" is the value of T with the decimal portion truncated, i.e., the integer portion of T. For example: if T=5.1, Floor(T)=5 and if T=2.9, Floor(T)=2.

By using random number in this way, process 510 controls the average number of replicas 120R replicated from packets, determined by the target set in "T", and therefore the extra amount of network facilities that are needed.

In step 512, for any given packet 120, a random number, R, is generated between 0 and 1. Step 514 determines if R is less than the decimal portion of T. Specifically, is R<=T-floor(T). If true, step 518 is executed which replicas the packet 120 more times than if step 516 was executed. Here the number of replicas is related to the integer value of T (i.e., floor(T), specifically floor(T)+1. On the other hand, if R>T-floor (T), step 516 is executed and fewer or no replicas are made. Here the number of replicas is also related to floor(T), specifically are equal.

Alternate equivalent methods of controlling the average number of replicas 120R replicated are envisioned by the inventors.

Figure 5C:
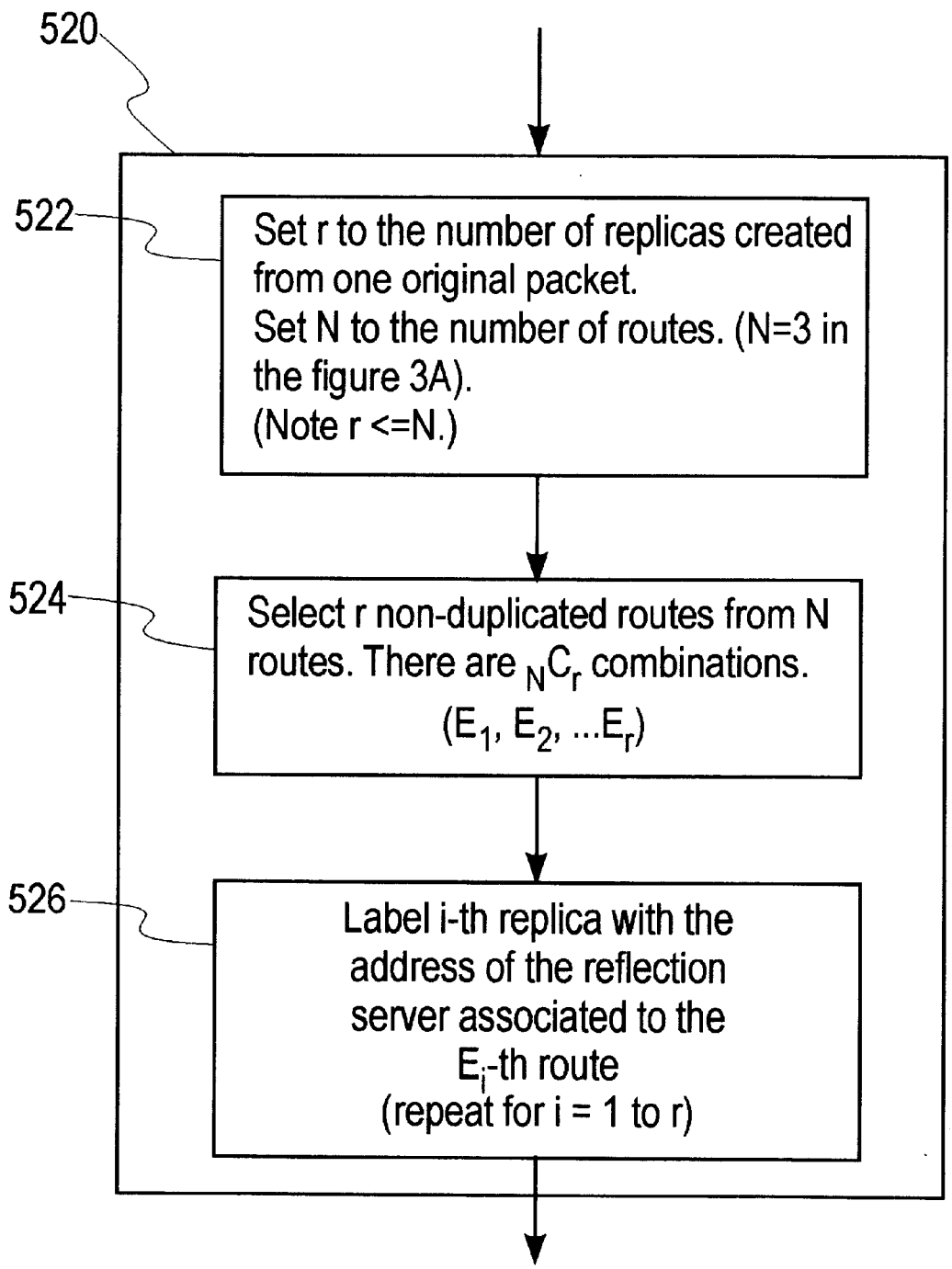

Process 520 of FIG. 5C adds a further enhancement to the invention. Here each of the replicas 120R is communicated over the N paths in a random way. (Note that the original packet 120 can be sent from source 260S to destination 260D without the use of this invention while replicas 120R of this packet can be communicated over different selected paths. On the other hand, in this disclosure, the original packet 120 is often referred to and treated as a replica 120R without loss of generality.)

In step 522, the value "r" represents the number of replicas 120R that are created for a given packet 120 by any of the processes described above. In step 524, r number of paths from the set of N selected different paths are chosen. This choosing is done randomly so that the replicas associated with any given packet 120 are randomly distributed over all the paths 275 necessary to communicate them over the network 130. Note that if r=N, no choosing is necessary, each replica 120R is communicated over one of the N paths 275.

In step 524, when r is smaller than N, the number (r) of replicas 120R is used to choose r routes out of N available routes 275. For example, if 2 replicas 120R (including the original packet 120) are created and there are 3 different selected routes (275A, 275B, and 275C) there are (statistically 3 choose 2) $_3C_2=3$ ways of sending the two replicas 120R. Step 520 enumerates all $_NC_r$, ways, i.e. combinations $\{E_j\}$, and uses a random number to choose one of the $_NC_r$ ways. Thus, in this example, more than two replicas traveling on a same route is avoided. Again, here N is the number of paths and r is the number of replicas.

In step 526, each replica 120R is labeled with the address of the one of the respective paths selected in step 524. For example, each replica 120R is sent to the respective reflection router 270 associated with one of the paths in the $\{E_j\}$. In an alternative preferred embodiment, N−1 addresses (replicas 120R) are sent to reflection routers 270 associated with one of the chosen paths and the original packet 120 is given the address for the destination computer.

Figure 6A:
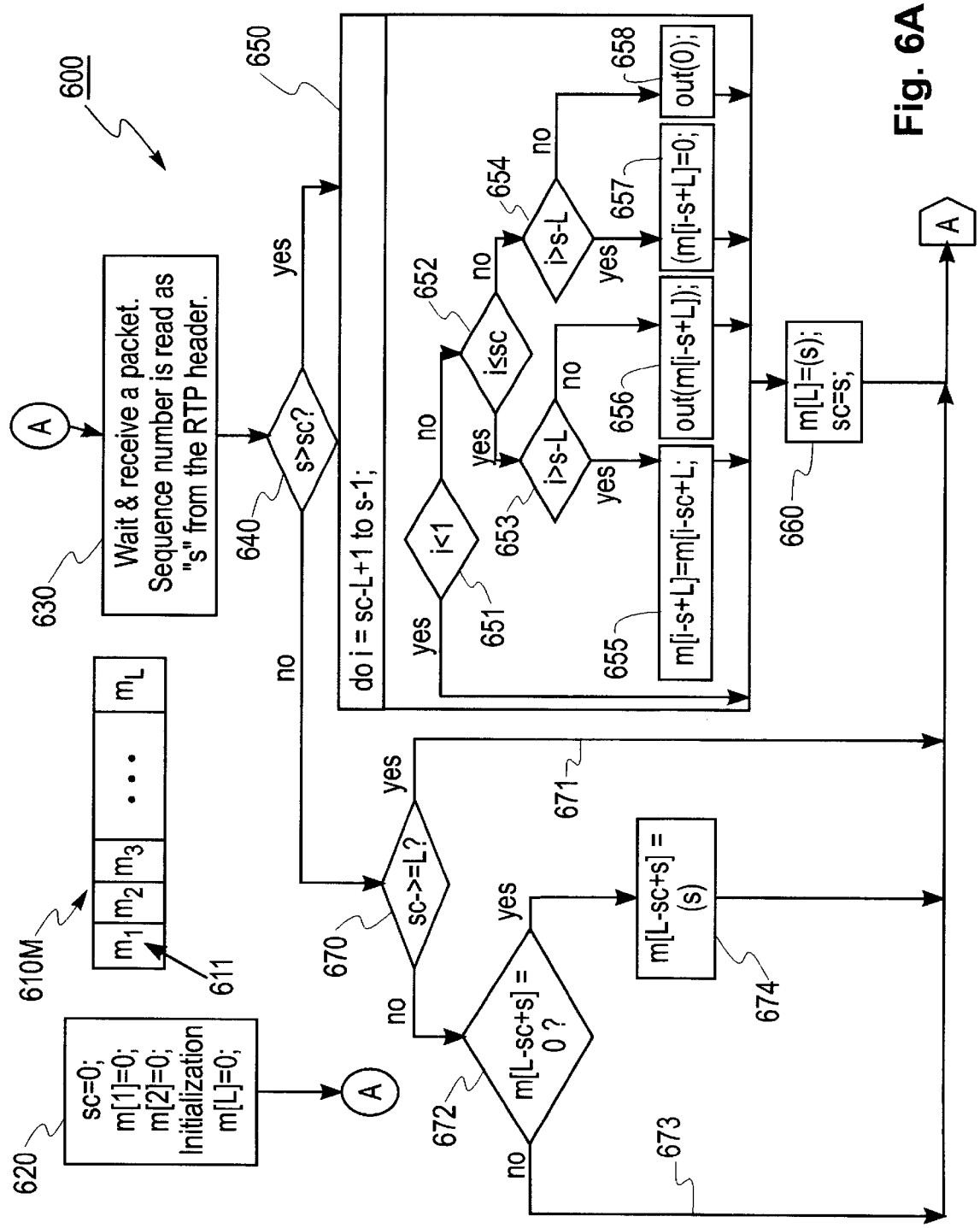
FIG. 6A is a flow chart of a packet unification process performed by a destination host in a preferred embodiment of the present invention.

FIG. 6A is a flow chart of a preferred packet unification process 600 performed by a destination host 260D in a preferred embodiment of the present invention.

Buffer array 610M has L elements (m[1], . . . m[L]) that are used to adjust the out-of-sequence packets. In a preferred embodiment, L=10 or less is adequate. Step 620 initializes the process 600. This initialization is executed only once prior to the session to initial the local variable "sc" and the buffer array M. In the initialization, the array content, m, and a variable "sc" (sequence current) will be set to 0. The variable "sc" is the number of the newest, most current, replica 120R received and therefore the newest (most current or rightmost) position of the buffer 610M, $m_L$ is associated with this packet.

The process 600 waits 630 for arrivals of replicas 120R. On arrival, the sequence number is read 630 from the RTP header and is set to the variable "s". In step 640, the "s" and "sc" are compared, i.e., the number, s, of the replica 120R just received is compared with the most current packet sequence number, sc, which is associated now to the rightmost element of the buffer 610M ($m_L$). If "s>sc", the packet (replica) just arrived has a number, s, newer than the newest sequence number, sc, in the buffer 610M. Therefore, the buffer 610 needs to be moved to the right in order to include the packet sequence "s" of this just arrived packet. In this case, control is passed to step 650. On the other hand, if s<=sc, the newly arrived packet has a number, s, that is previous (older) than the most current packet stored in the buffer. This means that the memory location associated with the newly arrived packet in this case is within the buffer or that the buffer has already moved passed it. In this case, control is passed to step 670.

For sequence numbers, s, of arrived replica that are less than or equal to "sc" (640), step 670 is performed. In step 670, the position of the received packet, s, is compared to the location of the memory locations, m, in the buffer 610M. If 670 sc−s>=L, all of the memory locations, m, of the buffer 610M have been passed by (are greater than) the position of s in the message being recreated Therefore, the newly received packet (replica 120R) is discarded 671 and control is passed back to step 630. However, if sc−s<L in step 670, the newly received packet (replica 120R) has a number s, associated with one of the memory locations, m, in the buffer 610M and step 672 determines if that associated memory location already has a value, e.g., step 672 checks if m[L−sc+s]>=0. If there is a value in the location m[L−sc+s], a replica 120R with this number s had already been received and the packet information already has been stored in the buffer 610M to recreate the message. Thus, the newly received packet (replica 120R) is discarded 673 and control is passed back to step 630. However, if there is no value in the associated memory position, e.g. if position m[L−sc+s]=0, then step 674 is performed to fill the buffer 610M position m[L−sc+s] with the information of the newly received packet (replica 120R.) That is buffer contents are updated (674) if the replica is the first one of the sequence number and still within the range of the buffer (not too late). In all these cases, the shifting of the buffer and the updating of "sc" do not occur.

Figure 6B:
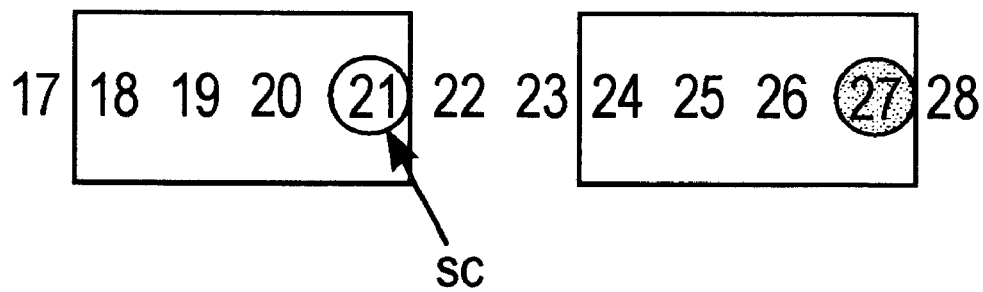
FIG. 6B is a diagram showing two examples of moving the buffer.
Figure 6B:
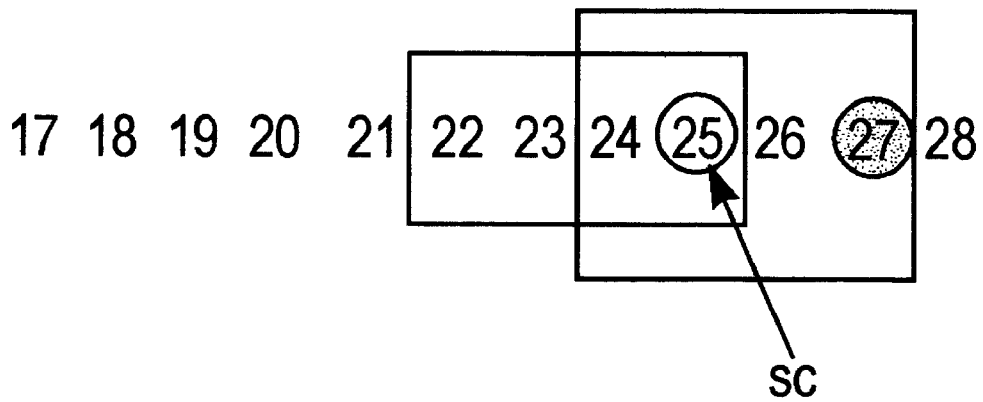

FIG. 6B shows the buffer 610M in two possible cases of moving the buffer 610 to the right, shifting that can occur in the performance of step 650. In both cases, buffers prior to the shift, without shade (in case a, positions 18–21 and in case b, positions 22–25), and after the shift, with shade (in case a, positions 24–27 and in case b, positions 24–27), are shown in relationship to the packet sequence numbers. In case (a), the arrived replica with sequence number 27 shifts the buffer further than L=4 positions (i.e., 27−21=6 positions). In case (a) none of the memory positions, m, covered in the old placement of the buffer 610M overlap the memory positions, m, in the new placement of the buffer 610M. In case (b), the newly arrived replica shifts the buffer moderately (27−25=2 positions). In case (b) some of the memory positions (24 and 25) in the old buffer placement overlap some of the memory positions (24 and 25) in the new placement of the buffer 610M.

These two cases cover all possibilities of required actions due to buffer shift, step 660. In case (a), the newest (highest or rightmost memory position, m) packet sequence number (sc) has the value 21, prior to the arrival of replica for the packet #27. In case (b), the sc is set to 25. A replica with a sequence number s=27 is then received. Since this sequence number is greater than sc (step 640) for both cases, the process 650 will be applied. Process 650 iterates over all the memory positions starting from the first memory position, m1, in the buffer 610M until one memory before the position received by the newly arrived replica 120R. In other words, index-i, iterates from sc−L+1 until s−1.

More specifically, process 650 handles for possible cases if the buffer is to be shifted to the right 660. Case 1 includes, the memory (packet) positions which are in the old buffer (before shift) but not in the new shifted buffer (after shift). For example, positions 18 through 21 in case (a) and 22 and 23 in case (b) are included in case 1. In case 1, the buffer 610M is shifted so as not to include these positions and the information in these positions is passed to the destination computer output 133 (656).

Case 2 includes the memory (packet) positions which are NOT in either of the old buffer (before shift) or the new shifted buffer (after shift). These memory positions fall into the "gap" and are shown as positions 22 and 23 in case (a). These packets are treated as "packets lost" (658) since none of the replicas of these packet positions has arrived within the time-limit (L), i.e., the buffer 610M has passed their memory position before any associated packet/replica 120R arrived at the destination computer 260D. Step 658 shows a "zero" output for these lost packets.

Case 3 includes the memory (packet) positions, m, which are in the old buffer (before shift) and also are in the new shifted buffer (after shift). Positions 24 and 25 in case (b) are included in the "overlapped" positions of case 3. Thus for case 3, whatever is kept in a memory position of the old buffer memory will be retained in a memory position of the new buffer. But the location of this memory position, m, in the buffer will change. Step 655 performs this "shift left" by setting m[i−s+L]=m[i−sc+L] for each memory position in case 3.

Case 4 includes the memory (packet) positions which are NOT in the old buffer (before shift) but are in the new shifted buffer (after shift). Memory positions 24 through 26 in case (a) and 26 in case (b) are included in case 4. Positions for these packets are created in the new buffer. However, because the packets associated with these positions in the buffer 610M (within time-limit (L)), have not yet arrived at the destination computer 260D, step 657 sets the value in each of these memory positions m[i−s+L]=0.

These cases are selected for each of the memory positions, m, iterated over by process 650, specifically at the decision points in steps 651–654. Step 651 checks that the index-i>0. This is not true when initially starting the process 650 and the buffer is shifted 660 until the entire buffer length, L, is available to the first receive replica 120R. Once the condition in step 651 is false, i.e., the entire buffer 610M is available, step 652 determines if the memory position being processed is less than or equal to sc, i.e., if it is possible for the memory position to be in the old buffer. If index-i<=sc, it is possible and step 653 checks if index-i>s−L, i.e., if the memory location falls within the old buffer, step 655 (case 3), or not, step 656 (case 1). If index-i>sc (step 652), it is not possible for the process memory, position to be in the old buffer and step 654 determines if index-i>s−L. If true 654, the memory location information has not arrived and case 4, step 657 is performed. If step 654 is false, the memory location falls within the "gap" and step 658 is performed (case 2.)

Step 660 shifts the buffer after step 650 is complete by setting m[L]=s and sc=s.

Figure 7:
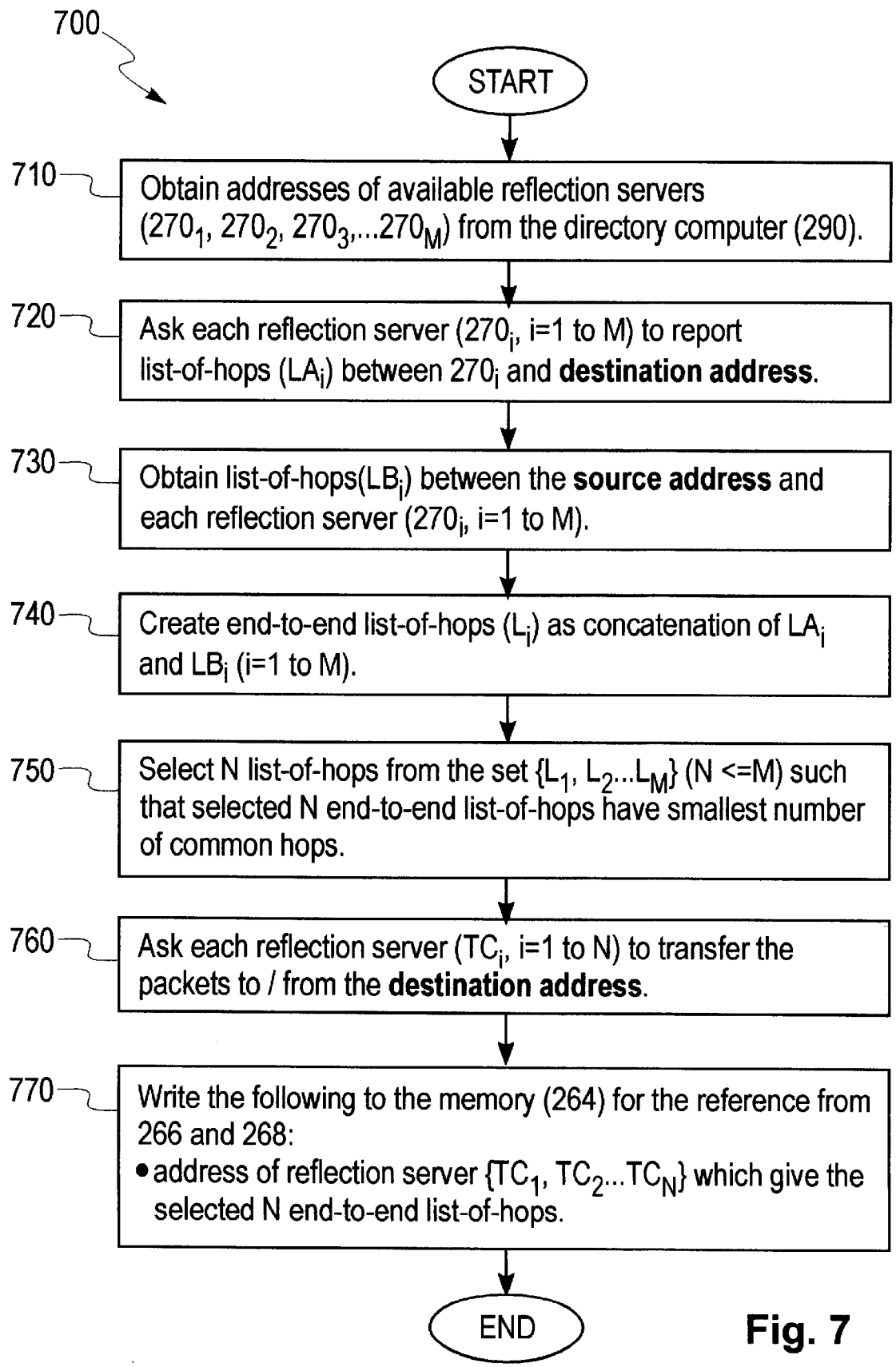
FIG. 7 is a flow chart of a handshaking process performed between the source hosts/computer and reflection routers/servers.

FIG. 7 is a flow chart of a handshaking (initialization) process 700 performed between the source hosts/computer and reflection routers/servers.

In step 710, the source computer 260S obtains IP addresses of reflection servers in service. These IP addresses are available from a network directory.

In step 720, the source computer 260S sends a request to all reflection servers 270 (or a subset of reflection servers) to report the connections (set of links or hops 175) between the respective reflection sever 270 and the destination(s) 260D. The result will be obtained as lists of routers between each respective reflection sever, Ri, and the destination computer 260D. The list are referred as LAi for each reflection router Ri. Standard IP protocol supports a command (tracert) to obtain this list. This request is processed by step 820 of FIG. 8, below.

In step 730, the source computer 260S checks the connections (set of links 175) between the source computer 260S and to all reflection routers. The result will be obtained as $LB_i$. This can be done by the same "tracert" command which is part of the IP Standard.

In step 740, corresponding LA and LB are concatenated to create the router list from the source computer 260S to the destination computers 260D through a particular reflection router, Ri. This list will be referred as LABi.

In step 750, the set of {LABi} will be examined for overlapping routers. Then N paths 275 are chosen such that the subset of {LABi} corresponding to these N selected paths 275 have least common routers.

Here is one preferred way to perform step 750:
1. Let S denote a set including the selected routes.
   Initially set S={route without using reflection router}.
   Let C denotes the candidate routes.
   Initially set C={routes corresponding to all available reflection servers}.
2. Using {$LAB_i$}, count the common routers in $LAB_i$ (j is one of element in C) against the routers included in {$LAB_k$} (k is one element of S) and set to $P_j$. Select j which gives minimum $P_j$. Now j is selected.
3. Insert "j" into S and remove "j" from C.
4. repeat from 2 until size of S becomes sufficient. (=N).
5. When 2~4 ends, the set S contains the selected reflection servers.

In step 760, the source computer 260S asks the N reflection routers, one for each selected path 275, to provide service. Thus, a target destination address will be sent to each replication router 270. The target destination address will be kept in the address mapping table 810 inside the reflection servers. The reflection servers use this address later to forward the replica 120R to the destination(s) 260D. This request will be processed by 830 of the reflection router chart (FIG. 8).

In step 770, the IP addresses of each of the selected N reflection routers are written into the memory 262 so that the replication process 500 and the unification process 600 can used these IP addresses. The memory 262 will keep the {S} determined by 750 which was explained above. The list of hops is inquired by issuing "Tracert" IP command in 820 and the result will be sent back to 260S for determination of best reflection router list {S}. There is no need to keep the list of hops in reflection routers. A directory should be outside of reflection router. Usually a domain gatekeeper or domain name server of IP can do this job. The domain name server, e.g. knows all available servers in the domain.

Figure 8:
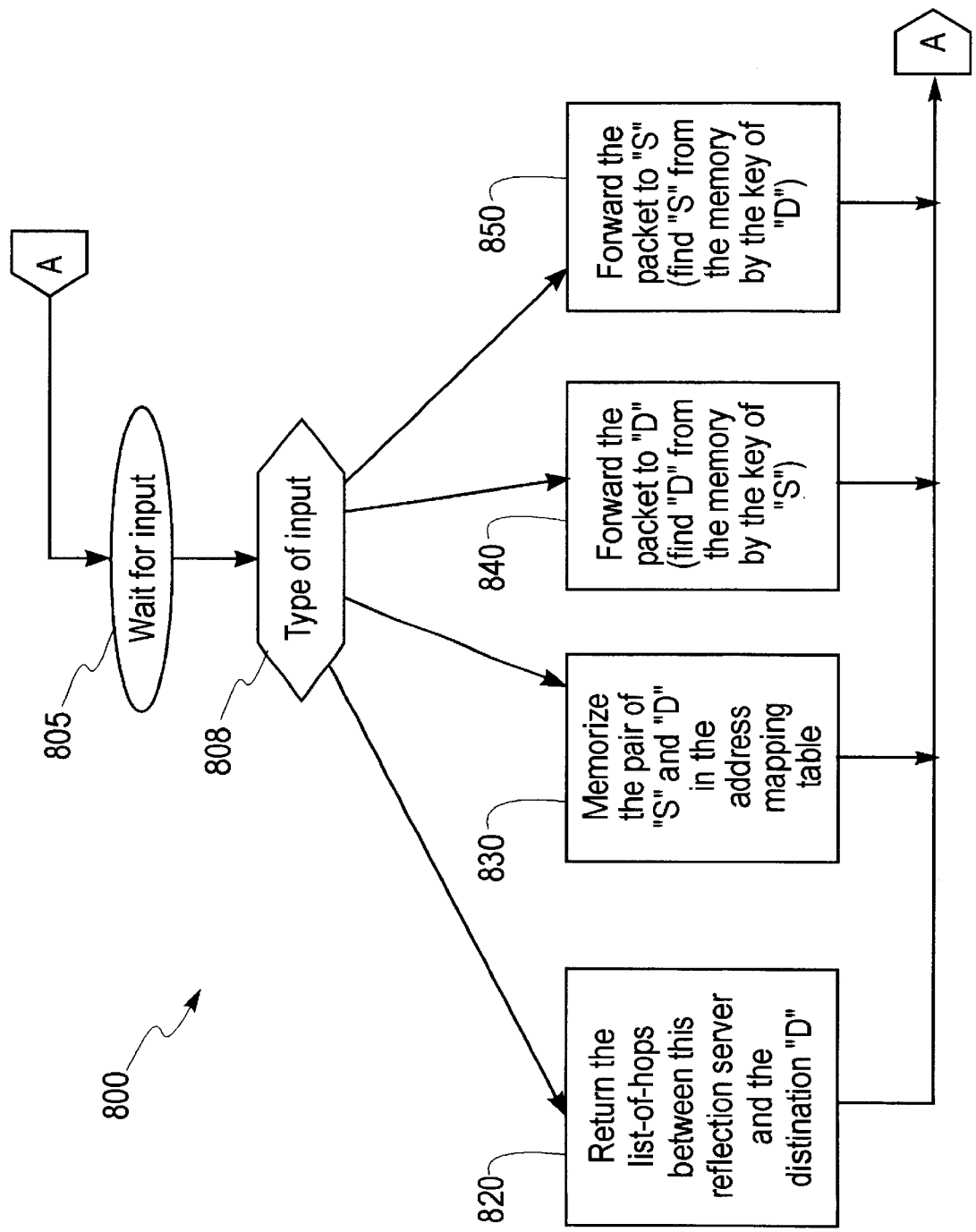
FIG. 8 is a flow chart of a processes performed by a reflection router.

FIG. 8 is a flow chart of a process 800 performed by one preferred reflection router 270. The reflection router 270 comprises one or more address mapping tables 810 (in FIG. 2) and four basic steps 820, 830, 840, and 850. The entry of the address mapping table 810 comprises of a pair of source 260S and destination 260D computers.

The process begins by waiting for an input over the network 805. This input is sent either from the source 260S or destination 260D computer. In step 808, the type of input is determined. The input can be: an inquiry for a list-of-hops, a transfer request, a packet 120R from the source computer 260S, or a packet 120R from the destination computer 260D. The first two types of input come to reflection router in the handshaking process. Each of these input types is handled by step 820, 830, 840, or 850, respectively.

If the input 805 comes from a source computer 260S as an inquiry for a list-of-hops from the particular reflection router 270 to the destination(s) 260D, step 820 is performed. Step 820 returns a list of hops (or a portion of a potential path 275) between the particular reflection router 270 and the destination(s). This step 820 was explained above in the explanation of step 720.

If the input 805 is a transfer request given from a source computer 260S, step 830 pairs the ip addresses of the source computer 260S and the destination computer 260D and adds the pairs to its address mapping table 810. When the communication session ends, the pair will be removed from the memory 810. The end of the session can be determined in two ways: 1. the source or the destination computers tells to hang-up or 2. the reflection router detects no activity over long period of time (time-out)).

If the input 805 is a (media) packet 120R sent from the source computer 260S, as identified by the header information on the packet 120R, step 840 is performed. In step 840, the ip-address of the source computer (sender) 260S is used to scan in the first elements (identifying the source computers 260S) of the stored pairs of the address mapping table 810. Once the pair containing the source computer 260S is found the packet then is resent to the destination computer (or computers 260D) which is in the second element (identifying the destination or destinations 206D associated with the source 260S) of the found pair.

If the input 805 is a (media) packet 120R sent from the destination computer 260D, as identified by the header information on the packet 120R, step 850 is performed. In step 850, the ip-address of the destination computer 260D is used to scan in the second elements (identifying the destination computer(s) 260D) of the stored pairs of the memory 810. Once the pair containing the destination computer 260D is found the packet 120R then is resent to the source computer (or computers 260S) which is in the first element (identifying the source or sources 206S associated with the destination 260D) of the found pair.

Figure 9:
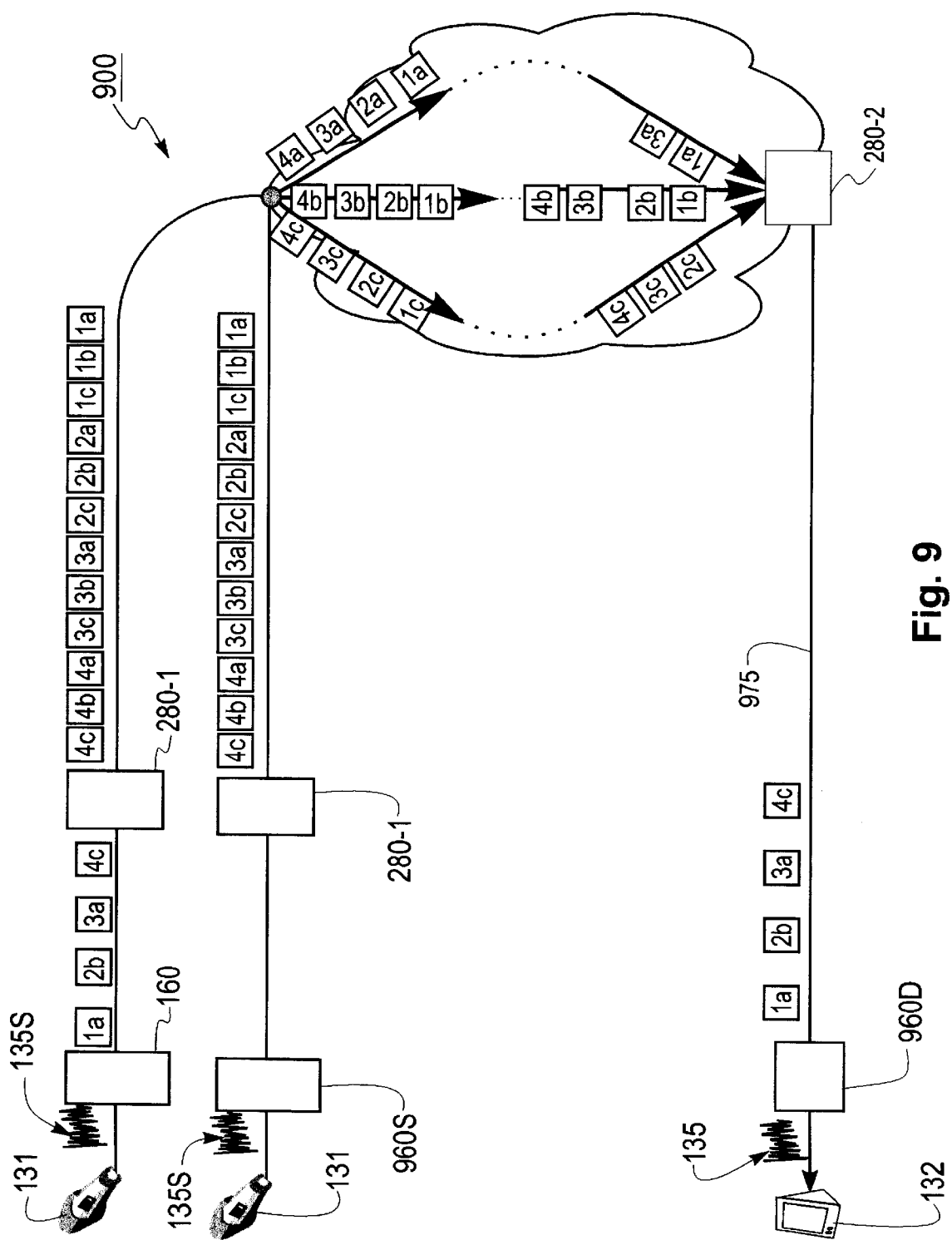
FIG. 9 is a block diagram showing alternative uses of a preferred embodiment in the redundant media transmission enabled network access points.

FIG. 9 is a block diagram showing an alternative preferred embodiment 900 of the invention. In this embodiment, the redundant media transmission is produced at one or more network access points. These access points are routers 280 with the functions of source and/or destination computers 260 combined with the functions of the reflection routers 270. For example as shown in this figure, it is possible to imbed the replication process 500 and the unification process 600 in access points 280. Access points 280 with imbedded replication process 500 and/or unification processes 600 described above are called "redundant media transmission enabled network access points" (or just redundancy access points, typically 280) and would typically be managed by an internet service provider (ISP). In one preferred alternative of this embodiment, the source and/or destination computer are standard prior art computers 160 with none of the features of this invention. Typically, the link (175, 975) between the source and/or destination computer 160 is as short as possible, e.g. a local phone link connection, to minimize any packet losses or delays between the source/destination computer 160 and the redundancy access point 280. Since the replication 500 and/or unification 600 occur in ISP network (at the access point 280), dial-up access line, between 150 and 140, could be lower in bandwidth.

The benefit of this embodiment is to allow computers with regular Internet media software to get the benefit of quality of service (QoS) enhancement by the redundancy feature of this invention, i.e., no additional software needs to be operating on the source and/or destination computer. This can occur in several ways. The source computer (160, 960S) can be a standard computer with a connection to a first redundancy access point 280-1. At this access point 280-1, replication 500 of the packets 120 occurs using any of the processes described above. The first redundancy access point 280-1 determines the multiple paths and how the replicas 120R are communicated over the network 130. (Alternatively, the replication 500 by a source computer 260S enhanced with the present invention.) The replicas 120R are either received by a destination computer 260D enhanced with the present invention and processed as described above or by a second redundancy access point 280-2. If an second redundancy access point 280-2 is used, the unification process 600 is performed at the second redundancy access point 280-2 and the unified (re-created) message is passed over the short link 975 to a standard prior art computer 160.

Figure 10:
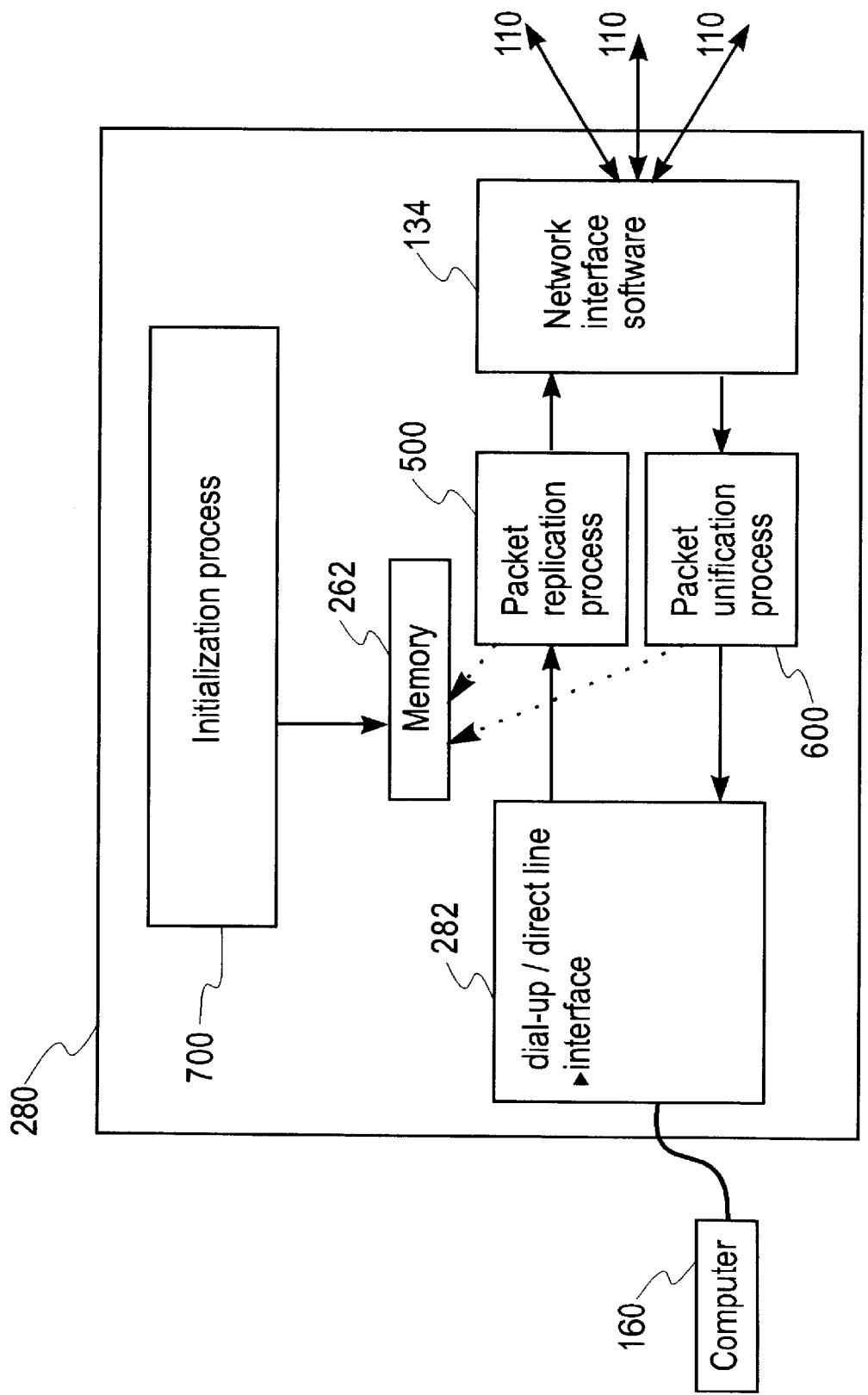
FIG. 10 is a block diagram of a network access points with redundant media transmission enablement.

FIG. 10 is a block diagram of a network access point 280 with redundant media transmission capability. The access point 280 has a well know interface 282 with one or more prior art computers. There is also a well known hardware and software interface 132 with one or more links 175 of any general network 130 connected to one or more routers 110. Note that the router 110 function and any of the redundancy access point 280 functions can be combined. The redundancy access point 280 further has any one or more of the following described above: the initialization process 700, the memory 262, the packet replication process 500 and/or the packet unification process. As described above, packets 120 and/or requests are received from the computer 160, replicated by the replication process 500 and communicated over the network on two or more paths. In like manner, requests and/or replicas 120R are received from the network (130, 110) by the network interface and unified by the packet unification process 600 before they are sent as a re-created message to the computer 160.

Given this disclosure, equivalent embodiments would become evident to one skilled in the are. This equivalent embodiments are also within the contemplation of the inventors.

We claim:

1. A computer with one or more interfaces to one or more networks, the interfaces communicating one or more packets in one or more messages over one or more of the networks, the computer comprising:

one or more processes producing redundant packets of the messages in a random manner and communicating the redundant packets over two or more separate paths through the one or more networks to a destination.

2. A computer, as in claim 1, where the computer is sending the message to the destination and the processes comprise:
   a replication process that creates a random number of each of the redundant packets by replicating one or more of the packets in the message to form one or more replicas of one or more of the packets; and
   an initialization process that sends a request for path information over the at least one network through one or more of the interfaces to one or more reflection servers on the at least one network, the initialization process receiving path information from the one or more reflection servers that defines one or more hops in a reflection router path from the respective reflection router to the destination, the initialization process selecting two or more separate paths to send two or more of the replicas, at least one of the separate paths being from the computer to the one of the reflection servers and then on the respective reflection router path to the destination.

3. A computer, as in claim 2, where the computer is any one or more of the following: a client computer, a server, a router, and a network access point.

4. A computer, as in claim 2, where the random number is at least one for every packet in the message.

5. A computer, as in claim 2, where the replication process creates the random number of replicas for random packets in the message.

6. A computer, as in claim 5, where the initialization process randomly, selects the separate paths over which the random number of replicas of each packet is sent.

7. A computer, as in claim 5, where the random number of replicas created for each packet is limited below a chosen number.

8. A computer, as in claim 2, where the initialization process chooses the selected paths to have a fewest number of common hops.

9. A computer, as in claim 2, where the selected paths for one or more of the replicas are randomally selected.

10. A computer, as in claim 9, where the selected paths are selected for each replica to be least in common with the selected paths for other of the replicas.

11. A computer, as in claim 1, where the computer is receiving the message from the destination and the process is a unification process that receives each of the replicas, determines the position of the replica in the message, and arranges the replicas according to position in a destination memory.

12. A computer, as in claim 11, where later replicas that are received are discarded if a formerly received replica has already been placed in the respective position in the destination memory.

13. A computer, as in claim 11, where the computer is any one or more of the following: a client computer, a server, a router, and a network access point.

14. A computer, as in claim 1, where the packets are any one or more of the following: voice packets, video packets, media packets, and data packets.

15. A computer, as in claim 1, where information in the messages includes any one or more of the following: one or more television programs, one or more radio programs, and one or more telephone conversations.

16. A computer with one or more interfaces to one or more networks, the interfaces communicating one or more packets in one or more messages over one or more of the networks, the computer comprising:
   a replication process that creates redundant packets by replicating a random number of one or more of the packets in the message to form one or more sent replicas of one or more of the packets;
   an initialization process that sends a request for path information over the one or more networks through one or more of the interfaces to one or more reflection servers on the one or more networks, the initialization process receiving path information from one or more of the reflection servers that defines one or more hops in a reflection router path from the respective reflection router to a destination, the initialization process selecting two or more separate paths to send two or more of the sent replicas, at least one of the separate paths being from the computer to the one of the reflection servers and then on the respective reflection router path to the destination; and
   a unification process that receives one or more received replicas, determines the position of the received replicas in the message, and arranges the received replicas according to position in a destination memory.

17. A computer, as in claim 16, where the computer is any one or more of the following: a client computer, a server, a router, and a network access point.

18. A computer, as in claim 16, further comprising one or more input devices and one or more output devices, the input devices creating an input signal that is used to create the redundant packets of the message and the output devices creating an output signal from received replicas stored in the destination memory.

19. A computer, as in claim 18, where the input devices include any one or more of the following: a speech to text converter, a virtual world, a microphone, a telephone microphone, a keyboard, and a mouse.

20. A computer, as in claim 18, where the output devices include any one or more of the following: a computer screen, a virtual world, a speaker, a telephone speaker, and a text to speech converter.

21. A computer, as in claim 16, where there are a plurality of networks and at least two of the networks are connected together at one or more network access points.

22. A method of communicating messages over a network comprising the steps of:
   creating a random number of replicas of one or more packets in the message;
   selecting one or more different paths through the network to one or more destinations; and
   sending each of the replicas over one of the different paths.

23. A method, as in claim 22, further comprising the steps of:
   receiving one or more received replicas;
   determining a position of the received replicas in a received message; and
   arranging the received replicas according to their position in a destination memory.

24. A system of communicating messages over a network comprising:
   means for creating a random number of replicas of one or more packets in the message;
   means for selecting one or more different paths through the network to one or more destinations;
   means for sending each of the replicas over one of the different paths;

means for receiving one or more received replicas;

means for determining a position of the received replicas in a received message; and means for arranging the received replicas according to their position in a destination memory.

25. A computer, as in claim 1, where the computer is sending the message to the destination and the processes comprise:

a replication process that creates the redundant packets by determining a random number for each of the packets in the message to form one or more replicas of each packet, the replication process creating the random numbers wherein the redundant packets increase network traffic by a predetermined amount as compared to network traffic without the redundant packets.

26. A computer, as in claim 25, wherein each replication process performs the following for each packet:

generates a random number between zero and one;

determines if the random number is less than a predetermined decimal value;

replicates the packet a certain number of times when the random number is less than the predetermined decimal value, the certain number equal to a predetermined integer number plus one; and replicates the packet the predetermined integer number of times when the random number is greater than or equal to the predetermined decimal value.

27. A computer, as in claim 26, where the decimal value is determined by subtracting a result of applying a floor function to a rational number from the rational number, the predetermined integer number is determined by the result of applying the floor function to the rational number, wherein the decimal value represents a percentage increase in traffic due to the redundant packets.

* * * * *